July 19, 1955  G. P. BOSOMWORTH ET AL  2,713,382
TIRE BEAD LEDGE CONSTRUCTION
Filed May 2, 1952  6 Sheets-Sheet 1

INVENTORS
GEORGE P. BOSOMWORTH
FRANK S. KING
RICHARD C. SPRAGUE
BY Ely, Frye & Hamilton
ATTYS- July 19, 1955  G. P. BOSOMWORTH ET AL  2,713,382
TIRE BEAD LEDGE CONSTRUCTION Filed May 2, 1952  6 Sheets-Sheet 2

INVENTORS
GEORGE P. BOSOMWORTH
FRANK S. KING
RICHARD C. SPRAGUE
BY Ely, Frye & Hamilton
ATTYS.

July 19, 1955 G. P. BOSOMWORTH ET AL 2,713,382
TIRE BEAD LEDGE CONSTRUCTION

Filed May 2, 1952 6 Sheets-Sheet 3

INVENTORS
GEORGE P. BOSOMWORTH
FRANK S. KING
RICHARD C. SPRAGUE
BY Ely, Frye & Hamilton
ATTYS.

July 19, 1955   G. P. BOSOMWORTH ET AL   2,713,382
TIRE BEAD LEDGE CONSTRUCTION

Filed May 2, 1952   6 Sheets-Sheet 4

INVENTORS
GEORGE P. BOSOMWORTH
FRANK S. KING
RICHARD C. SPRAGUE
BY Ely, Frye & Hamilton
ATTYS.

July 19, 1955  G. P. BOSOMWORTH ET AL  2,713,382
TIRE BEAD LEDGE CONSTRUCTION
Filed May 2, 1952  6 Sheets-Sheet 5

INVENTORS
GEORGE P. BOSOMWORTH
FRANK S. KING
RICHARD C. SPRAGUE
BY
ATTYS.

United States Patent Office 2,713,382
Patented July 19, 1955

2,713,382

TIRE BEAD LEDGE CONSTRUCTION

George P. Bosomworth, Frank S. King, and Richard C. Sprague, Akron, Ohio, assignors to The Firestone Tire & Rubber Company, Akron, Ohio, a corporation of Ohio Application May 2, 1952, Serial No. 285,674

6 Claims. (Cl. 154—9)

This invention relates to pneumatic, blowout-safe, tubeless tires, and more particularly to methods and apparatus for the manufacture of, and to a novel bead construction for blowout-safe, tubeless tires of the diaphragm-compartmented type.

The suggestion has been made to provide a tubeless tire with a removable diaphragm having the general shape of an open-beaded tire and having inextensible bead portions, said diaphragm bead portions being adapted to seat and be retained upon rubber ledges on the lateral inside surface of the tire beads in substantially air-tight but removable relation therewith. The diaphragm so seated divides the space inside the tire into radially inner and outer chambers, the diaphragm being adapted to function as an auxiliary tire load carrying means in the event of a tire blowout thereby preventing complete collapse of the tire and making the tire substantially blowout safe.

To mount said diaphragm in a tubeless tire in order to provide the above mentioned blowout safe feature it has been proposed to provide the aforementioned rubber ledge around the lateral inside surface of each tire bead. The molding of this ledge in exactly the same shape and dimensions in tire after tire has heretofore been a serious problem. Exact reproducibility of the molded shape of the rubber ledge in the manufacture of successive, blowout-safe tires is necessary in order that the beads of any diaphragm will seat snugly in any tire. If the diaphragm beads do not fit against the rubber ledge snugly, air will escape from the inner to the outer compartment of the tire after a blowout and the protection normally provided by the diaphragm will be lost. In some cases a distorted or poorly dimensioned tire bead ledge may even result in the diaphragm being displaced from its seats during normal operation of the tire before blowout, the tire thus losing its balance and blowout-safe characteristics.

In shape the rubber ledge comprises an endless annular seat molded on and integral with the lateral inside face of each tire bead. Each ledge is provided with a substantially continuous radially outwardly opening groove adapted to receive and seat therein an inextensible bead of said diaphragm.

The formation of such a rubber ledge in a conventional pneumatic passenger tire would be impractical since the rubber required to form the ledge would be drawn or forced away from the fabric in the bead area during the ledge molding operation. Exposure of fabric in this area of a tubeless tire would result in air pressure loss by air wicking along the cords of the exposed fabric and subsequent deflation. Also, the exposed cords are subject to chafing because of lack of insulating rubber, with resulting failure during road operation of the tire. All of the foregoing enumerated difficulties are overcome by the present invention.

Heretofore the rubber ledge has been formed by premolding and cementing or curing it in position, or by the insertion of an all-metal molding ring into the tire against the lateral inside surface of both beads before vulcanization, but after bagging of the tire. Heat and pressure molded the contour of the metal ring into an excess of soft rubber superimposed on the lateral inside surface of the tire beads. When the tire was cooled, debagged and the all-metal rings removed, the rubber ledge remained. However, a disadvantage of using the all-metal ring resided in the distortion of the tire required for insertion and removal of the ring. Such tire distortion may produce incipient ply separations which could result in subsequent tire failure on the highway.

Another disadvantage of the all-metal ring resided in that it formed a rind or flash during vulcanization on the band ply of the tire, exposing body fabric. This was caused by the failure of the outer circumferential edge of the metal ring to fit snugly into the small space formed at the junction of the heavy-walled airbag used during tire cure and the band ply of the tire at a position near the base of the rubber ledge. After inflation of the tire, air seeped into this exposed fabric and thence out of the tire to cause separation of plies and deflation of the tire. The rind was minimized but not eliminated by providing a sharp edge on the metal ring at its outer circumference, but this sharp edge cut and mutilated the bead portion as the ring was inserted in and removed from the tire.

Further defective construction manifest in use of the all-metal ledge-molding ring was the displacement of the rubbery inner liner of a tubeless tire away from the tire cords in an area adjacent the curing bag to leave substantially no liner in the areas adjacent the curing bag and the metal ledge molding ring.

The use of a curing bag contoured on the lateral outside faces of the base thereof for molding the rubber ledge has been attempted. This method failed because the rubber of the curing bag assumed a permanent set under the heat and pressure of tire vulcanization distorting the grooves during repeated use, the effect becoming more pronounced with each successive cure. For this reason the rubber seating ledges were not identically shaped or dimensioned in successive tires.

The above-mentioned disadvantages of the prior art methods for forming the rubber ledge have been overcome in the present invention by the use of a thin flexible outer ring mounted on a solid metal inner ring used in a manner hereinafter to be described to produce a tire bead construction of a novel type.

It is therefore a general object of this invention to provide improved method and apparatus for the manufacture of blowout safe tubeless tires.

A further object is to provide an improved method for forming a ledge on the lateral inside surface of the bead of a blowout safe tubeless tire.

Yet another object is to provide a tire construction of an improved type in which the molding of a satisfactory rubber ledge on the lateral inside surfaces of the beads is facilitated.

Another object of this invention is to provide an improved apparatus and method for forming rubber ledges on the lateral inside surfaces of the beads of a blowout safe tubeless tire during tire vulcanization.

Still another object is to provide apparatus and processes for manufacturing tires in accordance with the foregoing object in which an air impermeable lining of uniform gauge is provided.

Yet another object of this invention is to provide an apparatus and method for forming a rubber ledge on the lateral inside surfaces of the beads of a blow-out safe tubeless tire during vulcanization in a mold of the modern, built-in, bagging diaphragm type.

Still another object of this invention is to provide a molding ring for molding a ledge on the lateral inside bead of a blow-out safe tubeless tire, which ring shall have none of the disadvantages of the prior art rings.

Yet another object of this invention is to provide a laminated ring with a flexible outer edge for forming ledges on the lateral inside faces of the beads of blowout safe tubeless tires.

Another object of this invention is to provide a blowout safe tubeless tire having an air-impermeable lining, said tire being constructed with a plastic filler strip properly positioned for the molding of a ledge on the lateral inside surface of the tire bead.

Other and further objects will become apparent as the invention is set forth in detail and by reference to the accompanying drawings of which:

Figure 1:
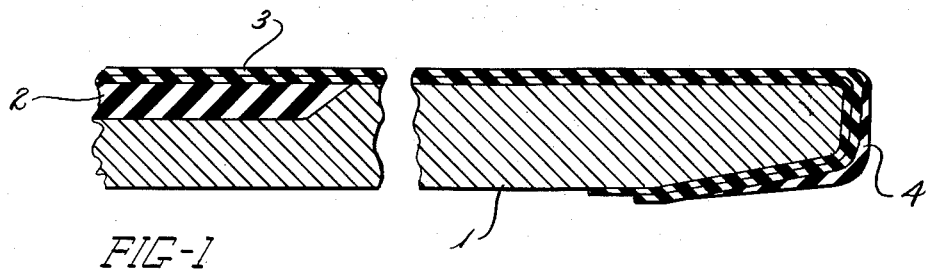
Figure 1 is a fragmentary sectional view of the initial phase of the assembly of the novel ledge portion of the blow-out safe tubeless tire on a tire building drum.

In reference to Figure 1, the initial phase of the construction of a blow-out safe tubeless tire is shown in a conventional tire building drum 1. The building drum is centrally recessed 360° around its outer surface to receive rubbery sealant member 2 which may be comprised of a butyl or natural rubber type polymer or any other rubbery polymer compound adapted to seal punctures in the finished tire. Innerliner 3 is next positioned on the tire building drum so that the edges thereof overlap the drum edges. The innerliner and sealant may be assembled before the drum operation if such procedure is desired. A ledge forming strip 4 of rubbery material is positioned annularly on each edge of the innerliner as shown and stitched thereto, the function of the strip 4 being to provide a volume of rubbery material to form the body of the aforementioned diaphragm seating ledge during the molding process. Both the innerliner 3 and strip 4 extend across the edge of the drum and are folded onto the inner face thereof.

Figure 2:
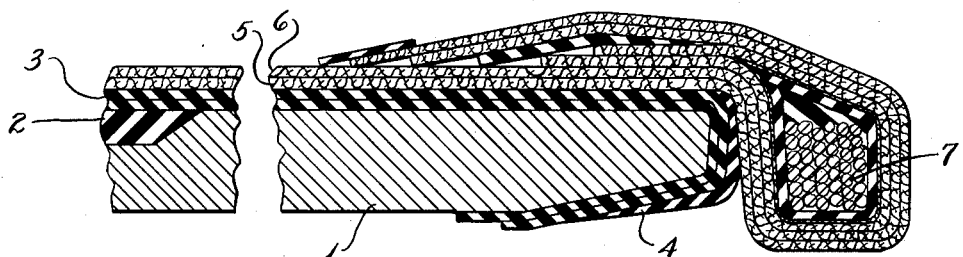
Figure 2 is a view similar to Figure 1 showing the bead applied.

Next, fabric plies 5 and 6 (Figure 2) are centrally positioned in turn on the drum with edges turned down and overlapping the edges of the drum. Bead assembly 7 is next seated against the turned down portions of said plies. Edges of fabric plies 5 and 6 are next turned back up around and in engaging and adhered to relation with bead assembly 7 and firmly stitched down thereto, a strip of rubber is then placed over the edges of the two fabric plies in the conventional manner for proper insulation and step-down of the fabric edges.

Figure 3:
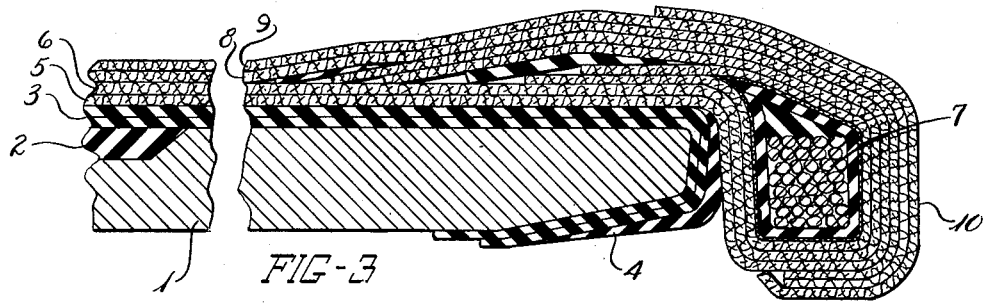
Figure 3 is a view similar to Figure 2 with fabric plies and a chafer portion added.
Figure 4:
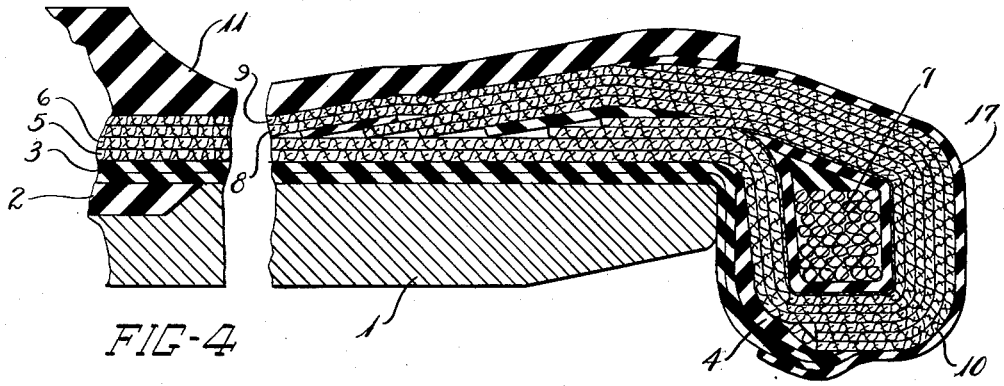
Figure 4 is a view similar to Figure 3 showing the tread position and sidewall of the tire applied.

As shown in Figure 3, fabric plies 8 and 9 are centrally positioned in turn on the drum and firmly stitched in place, the edges of plies 8 and 9 being stitched down around bead assembly 7. A nylon fabric chafer strip 10 is then positioned as shown on the bead assembly and firmly stitched thereto. Each bead is then covered with an abrasion strip 17 of rubbery material. Sidewall and tread assembly 11 is centrally positioned on the last ply 9 and firmly stitched thereto, after which innerliner 3 and ledge filler strip 4 are loosened from the drum 1 and turned back up around and firmly adhered to the fabric plies covering the bead assembly as shown in Figure 4. The tire is now complete and ready for further processing after removal from the drum by collapsing the drum inwardly to slip the tire therefrom. The unvulcanized tire, after it is removed from the drum, is ready for bagging and shaping after insertion of the novel rings of this invention for the forming of the rubber ledge seat on the lateral inside surfaces of the bead.

Although it has been shown to construct the tubeless tire with the ledge filler strip 4 underneath the innerliner 3 it is possible to reverse the construction and have the innerliner 3 underneath the ledge filler strip 4 in the finished tire. It is possible, also, to eliminate the innerliner 3 from the construction entirely when the blowout feature alone is desired. It also would be possible to form the innerliner and the filler strip in one piece by extruding or contour-calendering the innerliner with ledges on the edges thereof to provide the necessary stock for forming the diaphragm seating ledge. These and other constructions will be apparent to those skilled in the art from the disclosure set forth.

The innerliner 3 may be formed of any rubbery material which is preferably, but not necessarily impervious to the passage of air. Such a rubbery material may be comprised in part of butyl type rubber which, as described in United States Letters Patent Nos. 2,356,128, 2,356,129 and 2,356,130 to Thomas and Sparks, is essentially a copolymer of a major portion of an isoolefin and a minor portion of an open-chain conjugated diolefin. Other rubbery materials suitable for the innerliner are well known to those skilled in the art of tire compounding.

Figure 5:
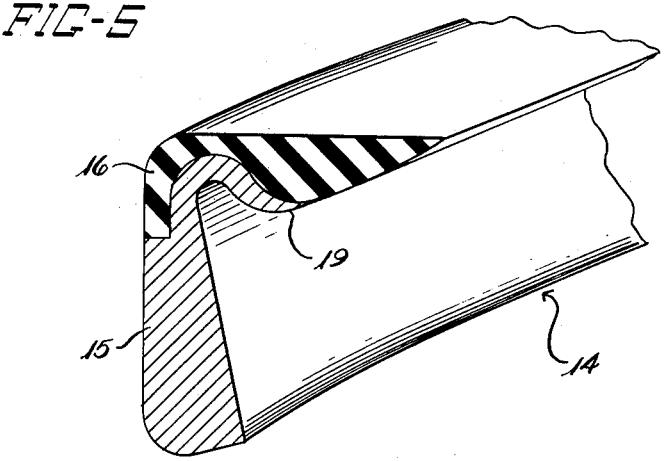
Figure 5 is a fragmentary sectional view in perspective of the novel ledge-molding ring of the invention.
Figure 6:
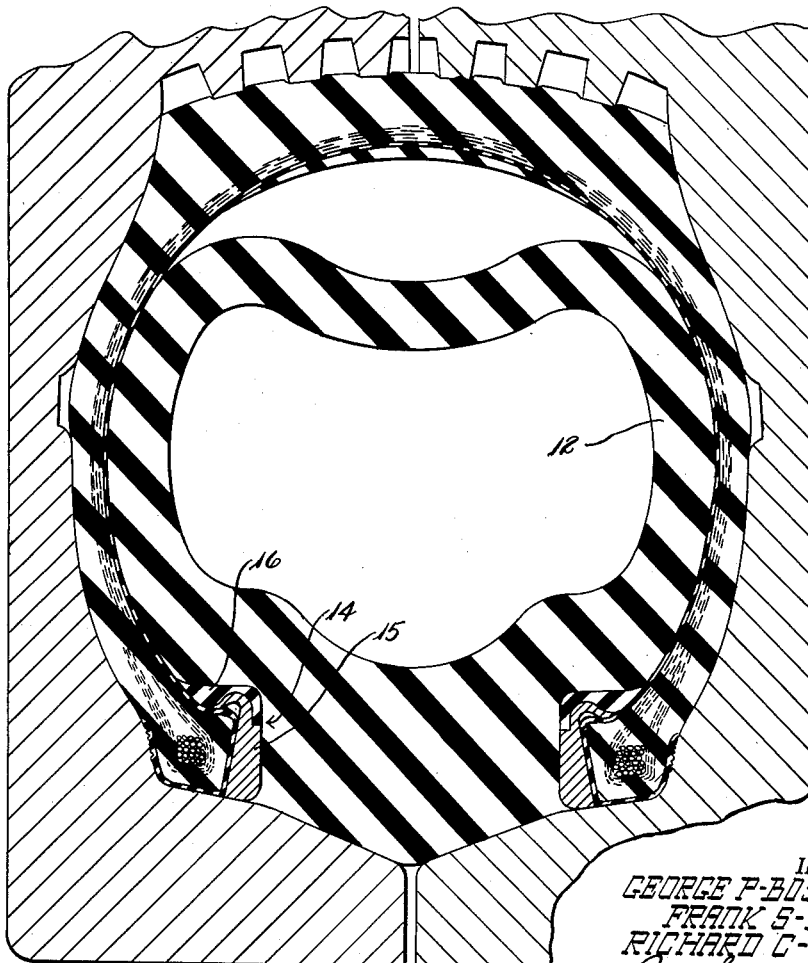
Figure 6 is a transverse sectional view of an unvulcanized blow-out safe tubeless tire containing an airbag and confined in a tire mold in preparation for vulcanization.
Figure 7:
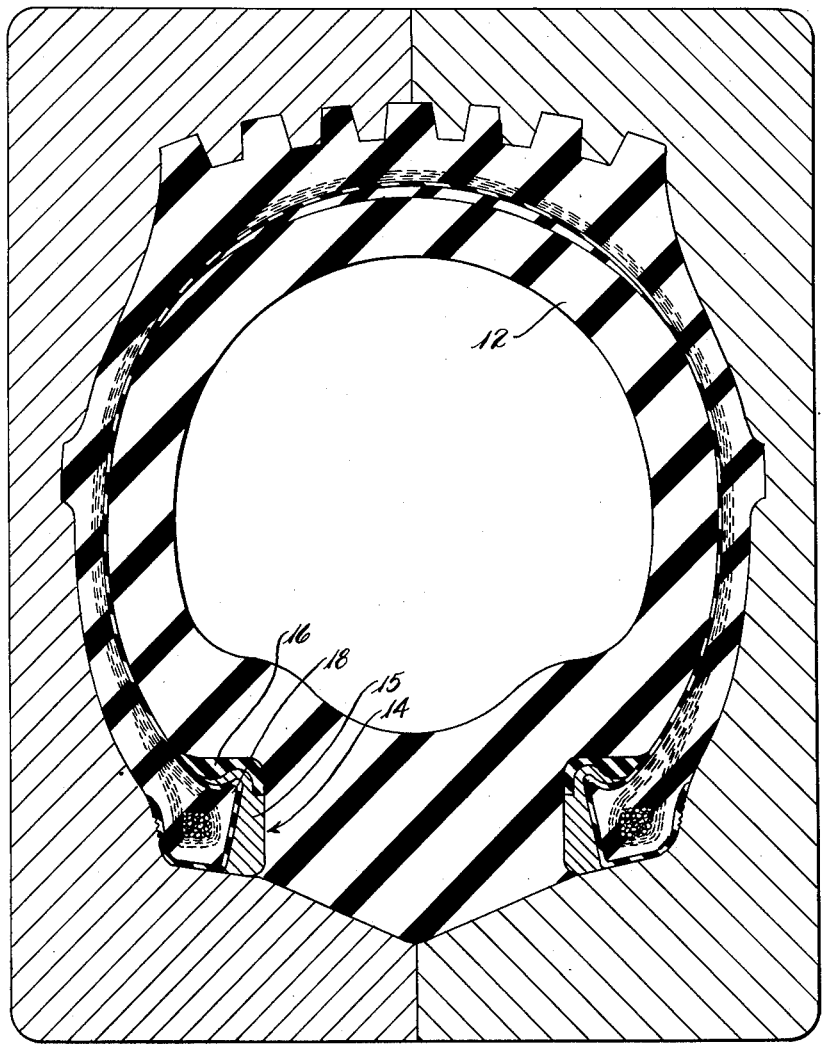
Figure 7 is a view of the assembly of Figure 6 showing conditions after application of heat and pressurizing of the airbag.

Referring to Figures 5–7 the novel, composite molding rings 14 comprise radial inner portions in the form of rigid rings 15. Rings 14 comprise, at their radially outer edges, annular components 16 of rubbery material permanently attached to said rigid portions by vulcanization or in any other manner satisfactory.

The flexible and rigid portions of rings 14 are so disposed as to expose the rigid hook shaped surface to the lateral inside surface of the tire beads. In the forming of the ledges 18 the ledges and adjacent grooves are molded by the rigid portion 15 of the ring. The flexible radial outer ring portion 16 molds the side of the ledge groove and the adjacent area of the inner ply 3 of the tire. The flexible nature of outer ring portion 16 prevents the edge 19 shown in Figure 5 of the hook of the rigid inner ring portion 15 from digging into and displacing portions of inner ply 3 and thereby exposing tire fabric.

The flexible outer ring may be of rubber, plastic, or any other flexible rubbery material which will easily adapt itself under pressure to fill the space between the tire and curing bag.

The tire may be bagged and shaped on a conventional bagging machine such as described in United States Letters Patent No. 2,006,307 to Allen. The shaped tire is then removed from the bagging machine and placed in an upright position in order that radial inward pressure may be applied to the top tread portion thereby extending the beads away from the curing bag contained in the tire. While the tire is in this position said novel metal-rubber ring is slipped into the tire between the bead and the curing bag in position to enable the ring to mold the lateral inside portion of the bead when pressure is applied internally to the curing bag during subsequent vulcanization. A similar ring is placed between the other tire bead and curing bag in a similar position. The radial pressure is released from the tire tread, and the tire resumes its shaped position and is ready to be placed in the vulcanizing mold. It has been found desirable to recess the lateral faces of the base of the curing bag to provide seats to accommodate the ledge molding rings in order to compensate for the excess rubber.

The assembled ring, curing bag, and tire are next positioned in a tire vulcanizing mold as shown in Figure 6. No pressure is in the curing bag 12, and therefor the ledge molding rings 14 have not been pressed into the soft rubber on the inside surfaces of the beads.

During cure, steam or hot water is forced under pressure into the curing bag and the molding rings are pressed against the soft rubber on the lateral inside surface of the tire bead.

Figure 7 illustrates the tire in the mold after cure showing the position of the curing bag 12 and of the ledge molding rings 14, and particularly illustrates how the edges of the flexible outer rings 16 of the ledge-molding rings have adapted themselves by bending from their normal position to fit between the curing bag and the tire. When the mold is opened and the tire removed therefrom, the molding rings may be removed. Because of the rubbery flexible composition of the outer rings, there is no chance of mutilating or cutting the soft hot rubber of the freshly vulcanized tire during the removal operation.

Although the blowout safe tubeless tire may be cured in the pot heater, watch case, or jacket type mold or any other tire vulcanizing mold it is possible to use the present invention in molds of the built-in-bag type such as the "Bag-o-matic Press" manufactured by the McNeil Machine and Engineering Company, Akron, Ohio. Because of the production efficiency of this type of mold, many blowout safe tubeless tires are vulcanized therein, and the necessity of forming the rubber ledge in the tire in this mold has required the adaptation of the novel ring to use with bag inserting type molds.

Figure 9:
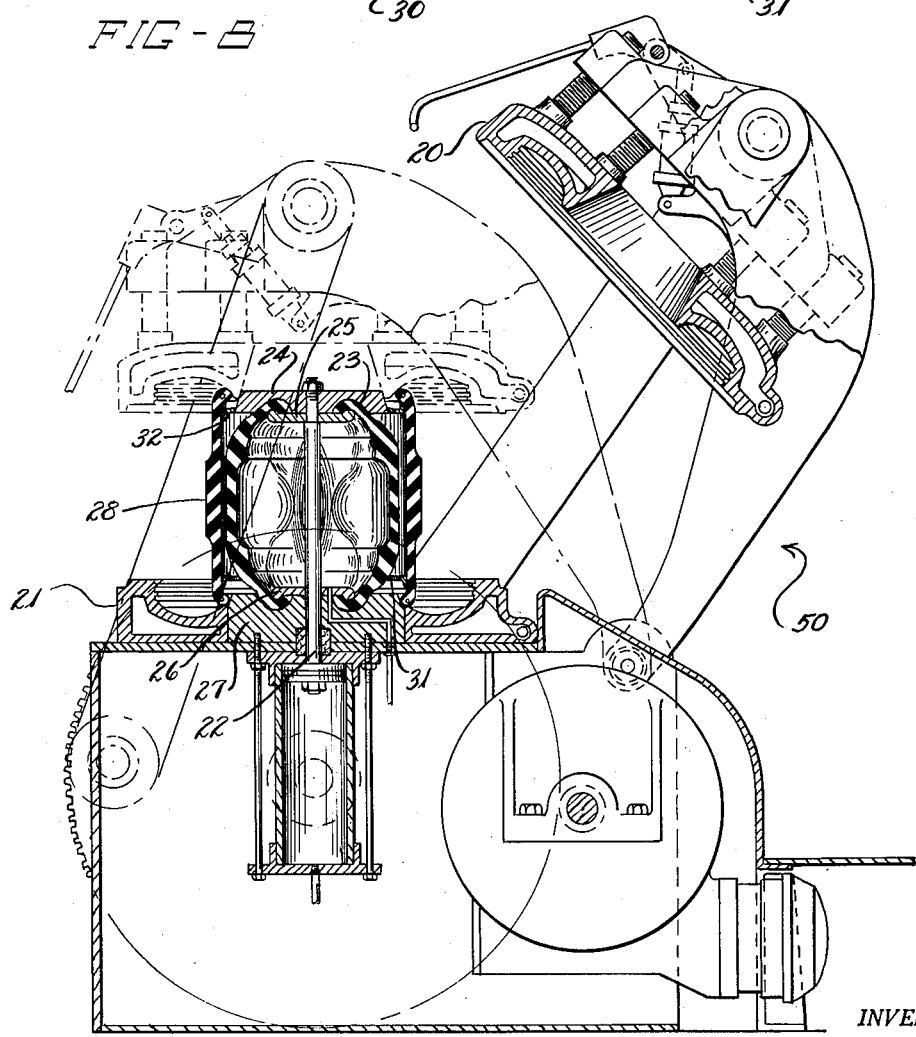
Figure 9 is an axial sectional view of a tire curing press of the built-in bagger type.
Figure 10:
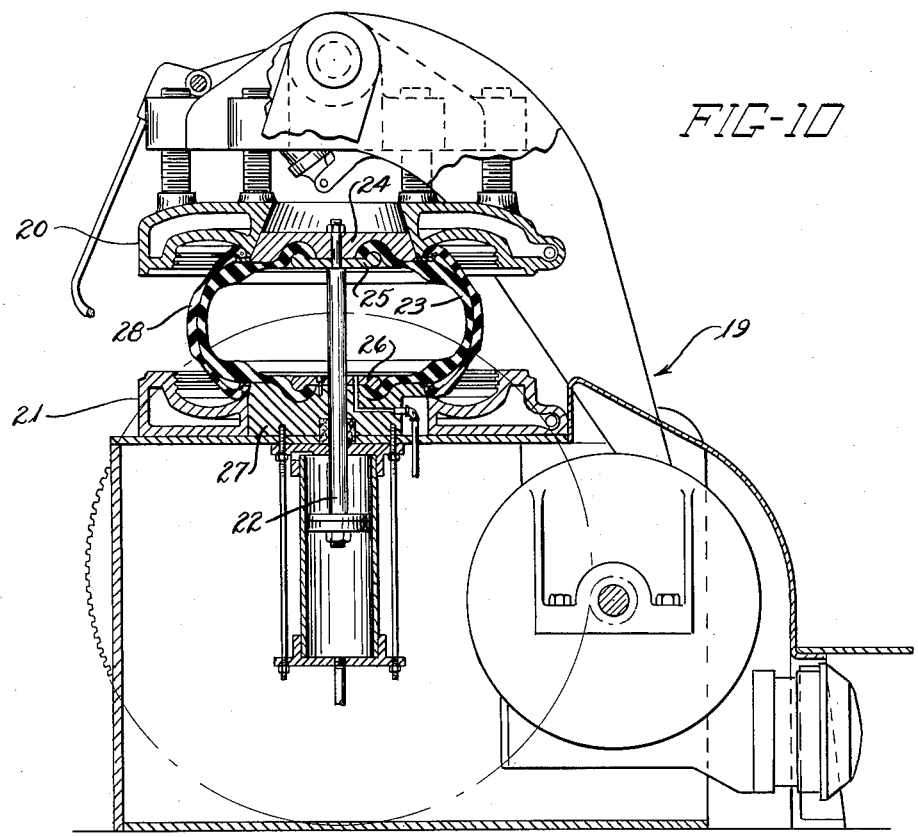
Figure 10 is a similar view with the mold partially closed.
Figure 11:
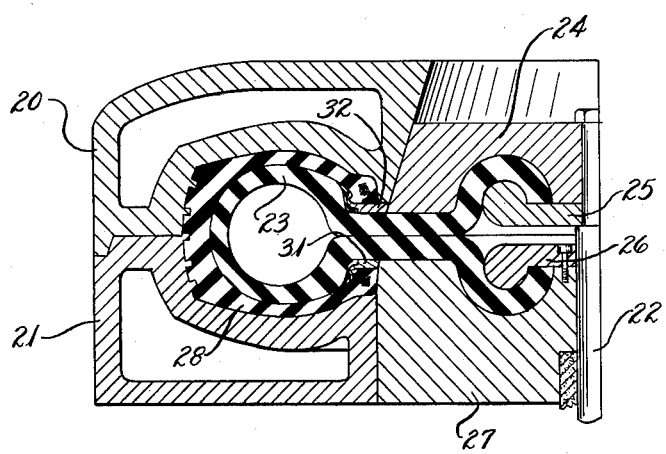
Figure 11 is an enlarged fragmentary section of a blow-out safe tubeless tire positioned in the curing diaphragm type mold during cure.

A mold of this type generally indicated at 50 is illustrated in Figure 9, wherein an upper movable mold section 20 and a lower fixed section 21 co-act to form the tire receiving cavity of a two section tire vulcanizing mold as described in Patent 2,296,800 to Soderquist. Piston rod 22 is axially mounted relative to lower mold section 21 and adapted for longitudinal movement as the mold is opened and closed by means not shown and not part of this invention. Cylindrical rubber curing diaphragm 23 adapted for containing hot water, steam, or other gas is radially disposed in surrounding relation to piston rod 22 and hermetically sealed to the upper end thereof by the clamping action of head 24 against upper clamping disc 25. Likewise, the bottom of cylindrical curing diaphragm 23 is hermetically sealed by lower clamping disc 26 and block 27.

To commence the curing operation using said curing diaphragm an uncured tire band 28 is positioned radially about shaping diaphragm 23 so that one bead rests on lower mold section 21. Upon operation of the operating mechanism, (not shown) upper mold section 20 is brought into position abutting lower mold section 21. While such positioning is taking place piston rod 22 is retracted axially through lower mold section 21 with accompanying distension of curing diaphragm 23 and shaping of the uncured tire 28.

Figure 8:
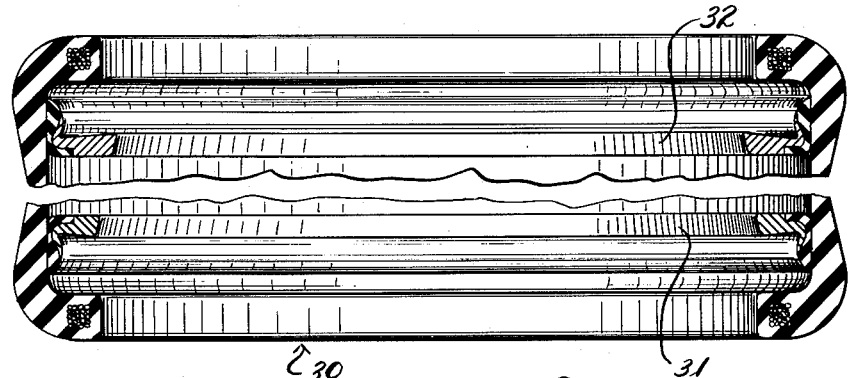
Figure 8 is a longitudinal sectional view of an unvulcanized tire mounting internally two ledge molding rings showing a modification of the invention for use during tire vulcanization in diaphragm inserting type molds.

The diaphragm seating ledge is formed in the blow-out safe tubeless tire in this case by the use of two novel rings 31 and 32 shown in Figure 8 mounted in an uncured, unformed tire 30. The diameter of head 24 and clamping member 25 of the mold requires that the diameter of lower ledge forming ring 31 be great enough to slip thereover. This ledge forming ring after passing over the head 24 seats on block 27. Upper ledge molding ring 32 has a diameter less than ring 31 but a diameter great enough to slide over the upper end of and partly down over and in seating relation to head 24. The inner annular surface of upper ledge molding ring 32 is tapered complementary to the taper of head 24 while the inner annular surface of lower ledge forming ring 31 is tapered complementarily to the taper of block 27.

The two rings may be positioned on block 27 and head 24 as heretofore described and an uncured, unshaped tire band slipped over both rings and the curing diaphragm of the mold in preparation for vulcanization. However, in the preferred modification of the invention the two rings are inserted in the uncured, unshaped tire band 30 as shown in Figure 8. The ring of greatest inside diameter, ring 31, is placed in what necessarily becomes and will be described as the base of the tire band. Ring 32, or less diameter, is positioned inside the bead at what has necessarily become the top of the tire band. The tire band thus assembled with the rings is lowered base down into radial position around the curing diaphragm of the mold. The upper and lower ledge molding rings 31 and 32 respectively register with the head 24 and block 27 respectively. The mold is closed as heretofore described and steam circulated in cavities provided in upper and lower mold sections 20 and 21. Internal gas or water pressure is supplied to diaphragm 23 to press the novel ledge molding rings into the soft hot rubber of the tire bead, forming the desired rubber ledge. After a length of time sufficient to vulcanize all portions of the tire to a desired optimum cure the mold is opened, the tire removed. The rings are removed from the cured tire and two uniform annular seating ledges remain on the lateral inside surfaces of the beads.

Figure 12:
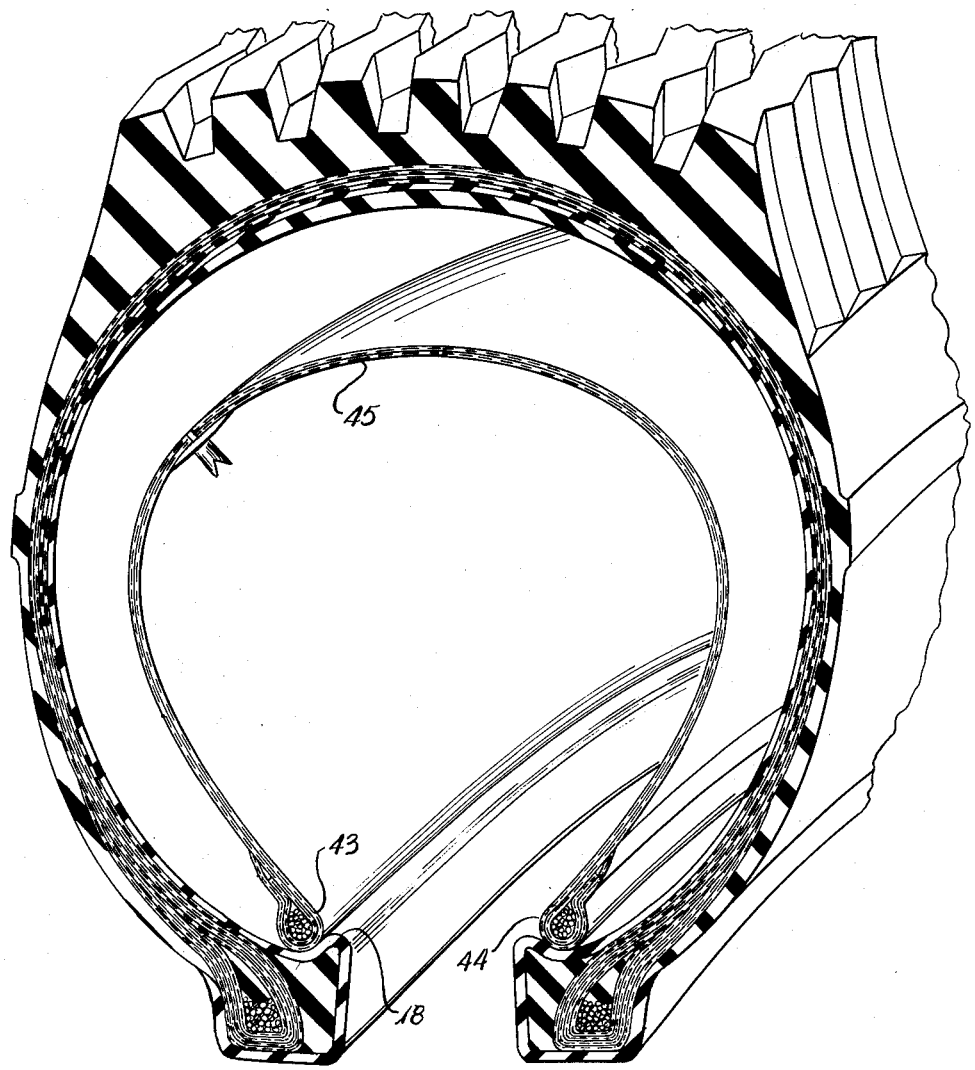
Figure 12 is a transverse sectional view of a vulcanized blow-out safe tubeless tire mounting a diaphragm on the molded seating ledges of the invention.

The annular ledges in the finished tire are now adaptable to the mounting of the inextensible beads 43 and 44 of removable air retaining diaphragm 45 as shown in Figure 12 whereby blow-out protection is provided during road operation of the tire.

Modification may be resorted to without departing from the spirit of the invention or the scope of the appended claims.

We claim:

1. In combination with an annular, hollow, curing bag of the type having a solid base portion, a pair of molding rings for molding a ledge-shaped contour on the lateral inside surface of the bead of a pneumatic tire cured on said bag, said bag having continuous, circumferentially extending, recesses in each lateral side of the base portion thereof, said curing rings being removably disposed in said recesses, said rings each being comprised of a rigid, annular, radial, inner portion and a resilient, flexible, annular, radial, outer portion, said radial inner portion substantially defining said molded ledge-shaped contour, said radial outer portion tapering axially and radially outwardly to terminate in a thin edge.

2. In combination, a fluid tight curing bag having a base portion and a pair of tire bead molding rings, each said curing ring being associated with one lateral side of said base portion and being laterally spaced and so located as to bear against the axially inner portion of the tire bead when the bag is inflated in the tire during cure.

3. A method of making a tubeless tire of the character described comprising the steps of inserting a curing bag in a partially shaped unvulcanized tire, inserting a rigid curing ring between the curing bag and each bead of the tire with the rings spaced apart and a portion of said bag interposed therebetween, placing the assembly of tire, bag and rings in a tire mold, subjecting the curing bag to internal tire molding pressure and the tire to vulcanizing temperature whereby said rings are forced against and shape the lateral inside surface of the tire beads, molding and vulcanization of the tire is accomplished with the said rings shaping the radially inner surface of the tire beads.

4. In combination with an annular hollow curing bag of the type having a solid base portion, a pair of molding rings for molding a ledge shaped contour on the lateral inside surface of the bead of a pneumatic tire cured on said bag, said bag having continuous circumferentially extending recesses in each lateral side of the base thereof, said curing rings being removably disposed in said recesses and said rings each being comprised of a flexible annular radial portion tapering axially away from said bag to provide a contoured molding surface.

5. In combination with an annular hollow curing bag of the type having a solid base portion, a pair of molding rings for molding a contour on the lateral inside surface of the bead of a pneumatic tire cured on said bag, said bag having continuous circumferentially extending recesses in each lateral side of the base portion thereof, said curing rings being removably disposed in said recesses, said rings each being comprised of a rigid annular radial inner portion and a resilient flexible annular radial outer portion.

6. In combination with an annular hollow curing bag of the type having a solid base portion, a pair of molding rings for molding a ledge shaped contour on the lateral inside surfaces of the bead of a pneumatic tire cured on said bag, said bag having circumferentially extending surfaces on each lateral side of the base portion thereof adapted to bear in mating relation against said molding ring, said curing rings being removably disposed against the lateral side of the base portion of the bag when the bag is inflated in the tire, said rings each being comprised of a rigid annular radial inner portion and a resilient flexible annular radial outer portion.

References Cited in the file of this patent

UNITED STATES PATENTS

| | | |
|---|---|---|
| 1,213,225 | McLeod | Jan. 23, 1917 |
| 1,289,768 | Hopkinson | Dec. 31, 1918 |
| 1,966,397 | Sohl | July 10, 1934 |
| 2,313,035 | Breth | Mar. 9, 1943 |
| 2,455,038 | Breth | Nov. 30, 1948 |
| 2,476,884 | Maynard | July 19, 1949 |
| 2,495,664 | Soderquist | Jan. 24, 1950 |
| 2,497,226 | McNeill | Feb. 14, 1950 |
| 2,587,470 | Herzegh | Feb. 26, 1952 |
| 2,597,550 | Tritt | May 20, 1952 |
| 2,612,461 | Hallgren | Sept. 30, 1952 |
| 2,614,056 | Kraft | Oct. 14, 1952 |

OTHER REFERENCES

Tires Service Station, February 1951, page 36, vol. XXXII, No. 7.